(12) United States Patent
Whitaker

(10) Patent No.: US 7,083,086 B2
(45) Date of Patent: Aug. 1, 2006

(54) TRANSACTIONAL CARD SYSTEM AND ENCODING METHOD

(75) Inventor: Michael L. Whitaker, Edmond, OK (US)

(73) Assignee: Plastag Holdings, LLC, Elk Grove Village, IL (US)

( * ) Notice: Subject to any disclaimer, the term of this patent is extended or adjusted under 35 U.S.C. 154(b) by 0 days.

(21) Appl. No.: 10/927,935

(22) Filed: Aug. 27, 2004

(65) Prior Publication Data

US 2005/0045732 A1    Mar. 3, 2005

Related U.S. Application Data

(60) Provisional application No. 60/498,200, filed on Aug. 27, 2003.

(51) Int. Cl.
*G06K 5/00* (2006.01)

(52) U.S. Cl. .................. 235/380; 235/492; 235/487; 283/61; 283/62

(58) Field of Classification Search ............. 235/492, 235/487, 493, 380; 283/61, 62
See application file for complete search history.

(56) References Cited

U.S. PATENT DOCUMENTS

| | | | | |
|---|---|---|---|---|
| 6,328,341 B1 * | 12/2001 | Klure | ......................... | 283/62 |
| 6,513,710 B1 * | 2/2003 | Haas | ......................... | 235/380 |
| 6,588,658 B1 * | 7/2003 | Blank | ......................... | 235/380 |
| 6,769,718 B1 * | 8/2004 | Warther et al. | ............... | 283/61 |
| 2002/0088851 A1 * | 7/2002 | Hodes | ......................... | 235/380 |
| 2003/0150919 A1 * | 8/2003 | Blank | ......................... | 235/487 |
| 2004/0173686 A1 * | 9/2004 | Al | ............................ | 235/492 |
| 2004/0182940 A1 * | 9/2004 | Biller | ......................... | 235/493 |

\* cited by examiner

*Primary Examiner*—Thien M. Le
*Assistant Examiner*—Allyson N Trail
(74) *Attorney, Agent, or Firm*—Martin G. Ozinga; Phillips McFall McCaffrey McVay & Murrah, P.C.

(57) ABSTRACT

An encoded transactional card system comprising a carrier having a first side, a second side, a top side, a bottom side, a front and a back; a card having a first side, a second side, a top side, bottom side, a front and a back, wherein the card is connected to and selectively detachable from the carrier and wherein the carrier generally surrounds the card first side, the top or bottom side and the second side; and a magnetic strip for encoding information wherein the magnetic strip traverses the carrier from the carrier first side across the card to the carrier second side.

1 Claim, 9 Drawing Sheets

FIG. 1A
PRIOR ART
FIG. 1B
PRIOR ART
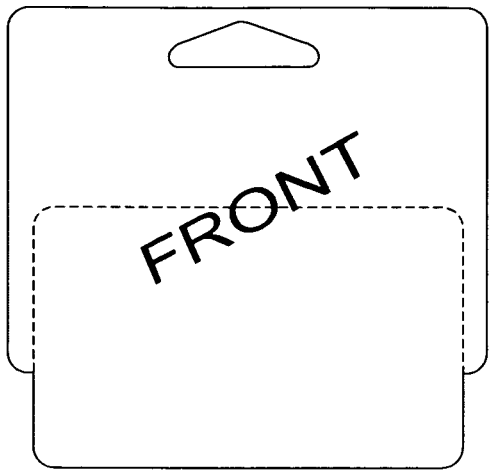
FIG. 2A
PRIOR ART
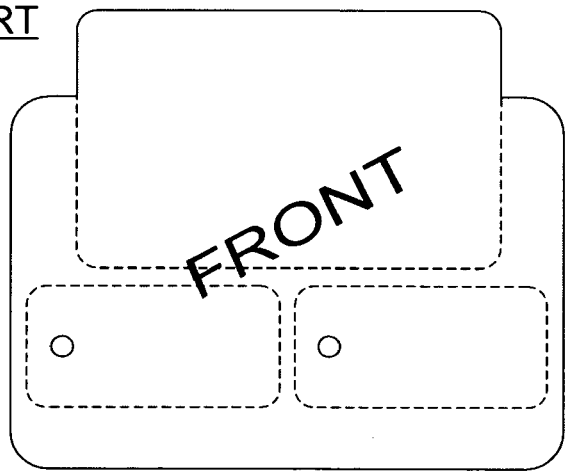
FIG. 2B
PRIOR ART
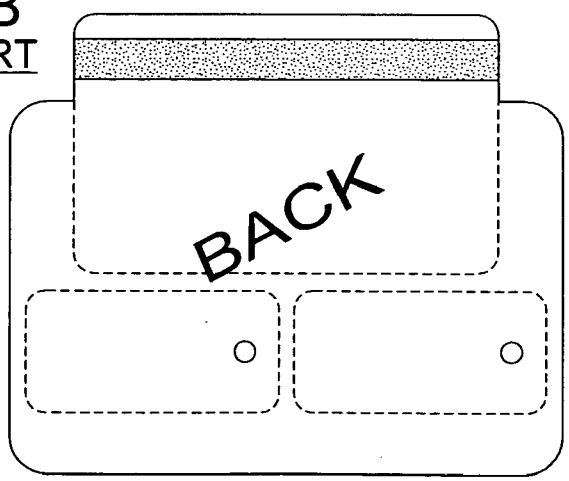

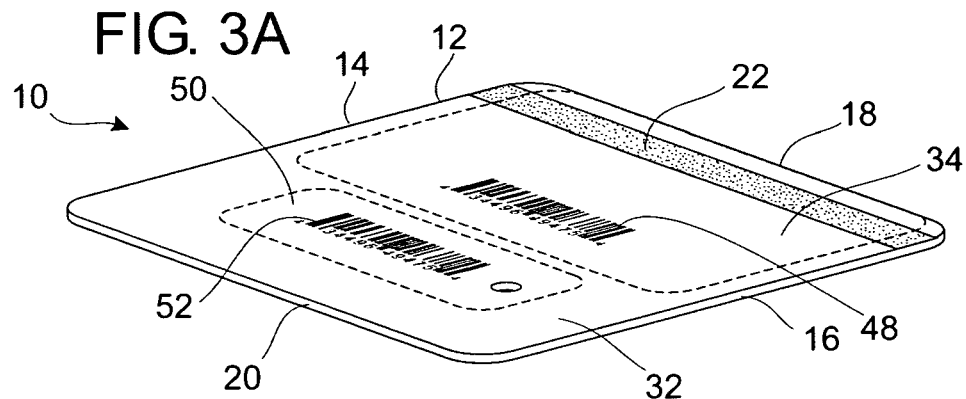
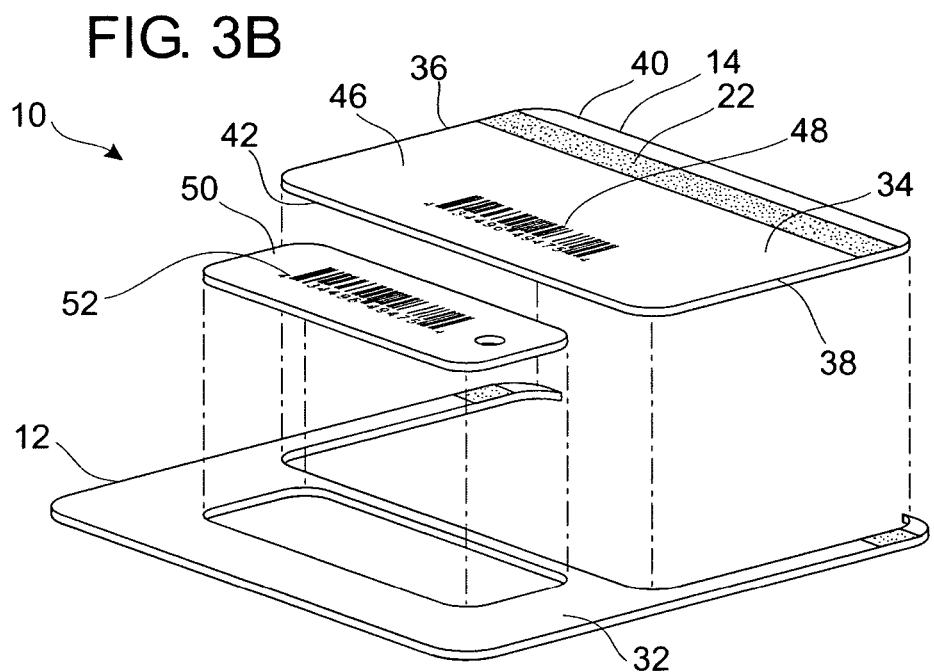
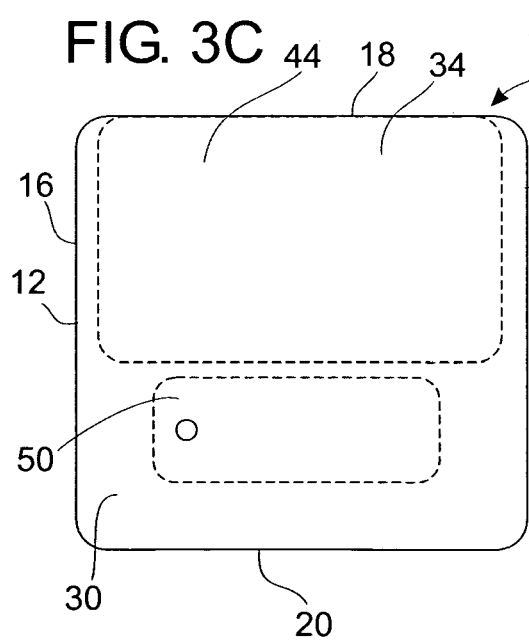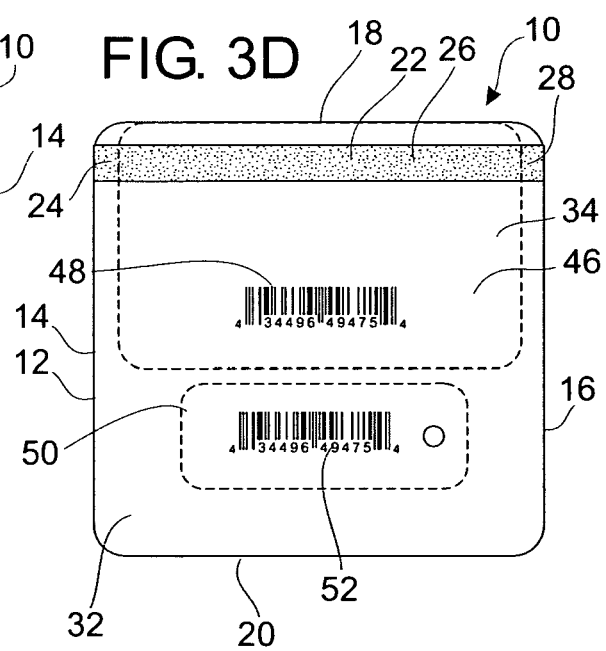

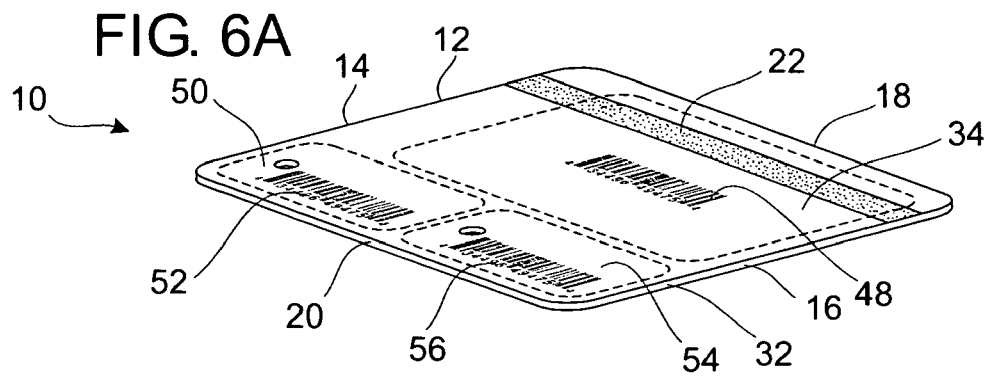
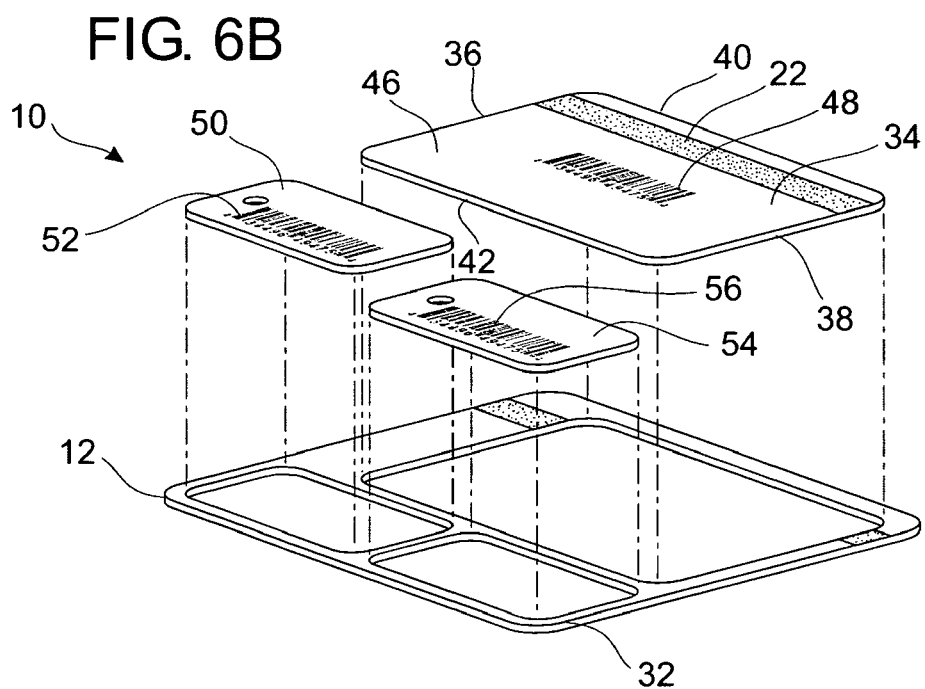
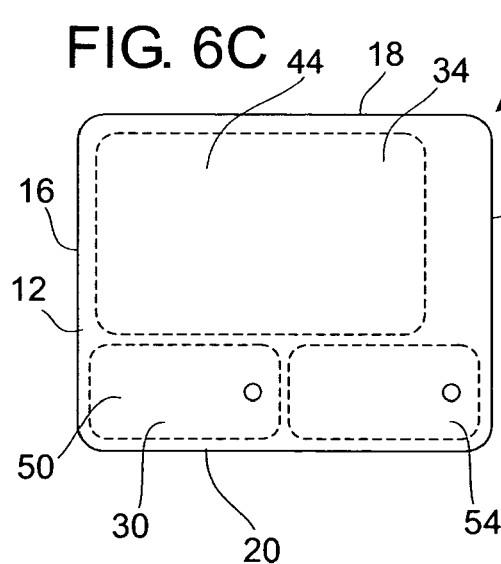
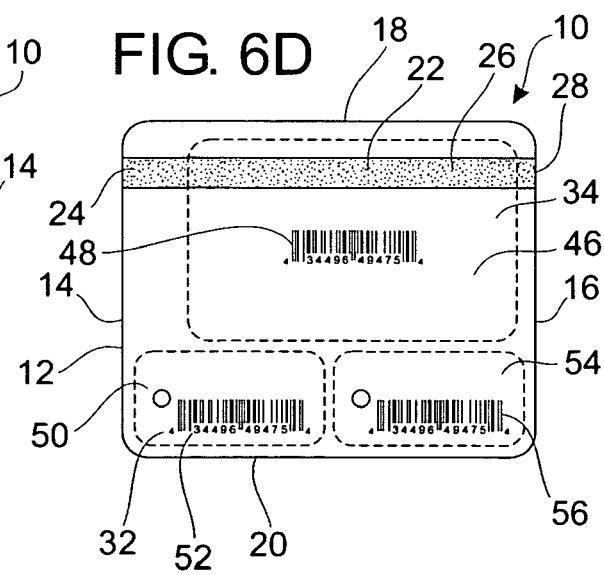

TRANSACTIONAL CARD SYSTEM AND ENCODING METHOD

CROSS-REFERENCE TO RELATED APPLICATIONS

Priority is claimed from provisional patent application U.S. Ser. No. 60/498,200, filed on Aug. 27, 2003, and incorporated by reference herein.

BACKGROUND OF THE INVENTION

1. Field of the Invention

In general, the present invention relates to uniquely encoded transaction card systems. More particularly, the present invention relates to a new and improved transactional card, method for making, distributing, using, and system thereof.

2. Description of the Prior Art

There is a substantial market for inexpensively manufactured, individually encoded, transaction cards for such uses as store credit cards, membership cards, I.D. cards, and the like. These transaction cards typically include information which has been encoded with unique characteristics. Often this encoding is done through bar codes that are used in conjunction with an optical scanner, magnetic strips or stripes used in conjunction with a magnetic/electric scanner, and often combinations of both. These formats permit automatic machine scanning of the card for identification, transactions and so forth. Typically, these cards are supplied in sets with one or more labels, tags, and the like being supplied with each card and bearing the same individual code number as the card for attachment to application forms, membership lists, and such.

Typically, a card is a paper or plastic printed product that contains information that is affiliated with a user-specific program, group or promotion. Cards may contain unique data (applicable to that specific card), generic data (applicable to a group), customized printed graphics, associated technologies (e.g. bar code, magnetic stripe, signature panel, SIMM chip, SMART chip, microprinting). A card can be any size, but is generally in the industry described as credit-card sized, 2.125 inch by 3.375 inch object. Of note, a card may also be a reference to or be described by the term key tag. Likewise, any other size of usable planer product that can be removed from a component carrier of like materials may also generally be referred to as a card.

The terms, matrix or carrier, is a reference to the means to hold the component parts together throughout the manufacturing process and deliver the component parts to the customer in one combined piece. Generally, these are made of a material that eventually is transformed into the component parts associated with transactional card systems. A carrier unit is generally a reference to a combination of component parts within a surrounding carrier made of the same material. The carrier is often the card material that surrounds the usable product on some or all sides of the products. Usable product is the pieces that will punch out to be saved and used by the consumer such as but not limited to key tags and cards.

A magnetic stripe or strip is generally a reference to narrow band of metallized tape that can receive and store magnetic energy in one, two and/or three tracks of information. Encoding is a general reference to the placement of variable data on magnetic media via magnetic energy. It is understood that current state of the art magnetic strips or stripes are typically 0.330 inches in width and contain three tracks (Track 1, Track 2, and Track 3) a with each track generally being 0.110 inches. One of ordinary skill in the art would also understand the typical layout of the tracks, information typically associated with the tracks and the location of information. Furthermore, one skilled in the art would understand recording density, character configuration, information content, numeric bits per characteristic, number of alphanumeric characters, numeric characters, and so forth. Likewise, one so skilled would understand the process of encoding using start sentinels, field separators, end sentinel, format code, longitudinal redundancy check character, and so forth. One such type of encoding, product and system is known under the trademark MAGTEK. It is also understood that the current invention may be utilized with non standard processes known in the art and should not be considered limiting to such.

Furthermore, activation is a general reference to the systematic authorization of a card as it is first distributed for use, usually via a swipe through a point-of-sale magnetic stripe terminal or barcode scan and/or the identification, authorization and updating of a card's debit balance where the parent data control system has already been loaded with the card's identity number and the card is already considered "active—with a zero or pre-set balance", whereby the card's activity is transmitted to the parent data control system that verifies and authorizes subsequent card activity. The term data is a general reference to any type of affiliated data that specifically relates to a carrier unit's contents, such as account number, bar code, serial number, SKU, PIN, or other identifiable data.

Cards within a like-material carrier are offered for a variety of commercial uses, such as phone cards, gift cards, membership cards, voucher cards, display cards, coupon cards, frequent shopper cards, loyalty cards, and other uses. These card-based products are often activated at the retail setting prior to issuance to the consumer via an activation swipe. When combined with a magnetic stripe on the card, traditional display cards must remove the carrier area adjacent to the beginning and end of the card's magnetic stripe for the reasons discussed herein and to generally allow for the carrier unit's encoding process. In addition, traditional display cards must remove the carrier material before and after the card's magnetic stripe cut seams due to conventional encoding equipment and standard commercial magnetic stripe readers at retail settings.

The typical carrier concept, sometimes known as a co-planer carrier, generally utilizes the traditional credit card size operation that is common in the plastic and paper card/voucher industry, such as gift cards, phone cards, loyalty cards, frequent shopper cards, membership cards, ID cards, and access cards. In the prior art, some card manufacturers have created card carrier combinations that end results in a card and two key tags, a card and one key tag, two cards only, two cards and two key tags, and one card detachable from hanging carrier. Furthermore, it is known to produce a carrier with a hang hole in the upper portion for use as a structural display carrier with the usable component parts detachable upon purchase and possibly activation.

In the prior art, manufacturers have met the needs of customers who wanted a magnetic stripe on the card or cards within a carrier product by removing the surrounding carrier material on each side of the magnetic stripe. See Prior Art FIGS. 1A, 1B, 2A, and 2C. The overall card unit would be passed through standard encoding equipment that would encode the magnetic stripe information. Standard encoding equipment begins encoding the card unit based upon the first edge encountered during the encoding swipe. Because encoding units must begin encoding when an edge is encountered, the carrier material could not be present before and after the magnetic stripe on the card unit itself. Until approximately 1999, only manual encoding was an industry standard feasible and available on small desktop encoder units.

The drawbacks of this prior art approach to card carrier design are numerous. The overall carrier is weakened by the removal of carrier surrounding the card unit. This means that the unit, if bumped, bent, or twisted, often pops the card loose from the rest of the carrier due to a lack of carrier support. In manufacturing the product, this issue is especially problematic with the newer automated encoding and printing machinery that use automated feeders and transport bases. These systems are very damaging upon weaker carrier designs. In the retail setting, consumers who handle the product without purchasing can irreparably damage the carrier unit by breaking the card's seam with the remaining carrier. Once damaged in the retail setting, the card is not likely to be purchased and/or used.

The prior art overall carrier unit is also clumsy to handle within automated feeding systems such as those of affixing and/or gluing. The unit's edges are not even on all sides, making automated card feeding sometimes difficult due to miss-feeds, skewed cards, etc.

Furthermore, visually, a carrier unit with the card's surrounding carrier removed is awkward in appearance due to uneven edges. Uneven edges make larger signs, as large versions of the carrier unit, difficult to manufacture for store displays.

Of note, the invention is not necessarily directed strictly to transactional cards and that the terms, words, and/or title referring to uniquely coded transactional card should not be considered limiting. Likewise, the current invention is not limited to traditional cards and systems known in the art. It is further understood and contemplated that the current invention may be used in association with items such as but not limited to sets of uniquely encoded transaction cards and devices, tags, labels, mailers, and other sheet elements. Still furthermore, other encoding methods may be contemplated other than magnetic, scanners, bar coding, or the like.

The current industry is constantly looking for cheaper, effective, and durable uniquely encoded transactional cards as well as methods and systems for implementation, encoding, and distribution to the consuming public. Thus, there is a need for a new and improved transactional card, system, and method of encoding and general use as outlined. The current invention provides an inexpensive and time saving device, method for making, and system where the prior art fails.

SUMMARY OF THE INVENTION

In view of the foregoing disadvantages inherent in the known types of transactional cards, systems of use and methods of making now present in the prior art, the present invention provides a cheap, convenient, and durable uniquely encoded card. As such, the general purpose of the present invention, which will be described subsequently in greater detail, is to provide a new and improved transactional card system and encoding method which has all the advantages of the prior art and none of the disadvantages.

To attain such, the invention includes a modified carrier wherein three complete sides of the card are enclosed or surrounded by the carrier and the fourth side of the card, where the card edge closest to the magnetic stripe is generally located, forms integrally or flush with the fourth side of the carrier. Such preferred embodiment is generally referred to as a flush edge embodiment or configuration. The embodiment is generally accomplished by modification of initial encoding of the entire magnetic strip that runs across the carrier. Such encoding generally encodes dead or quiet zones at the portion of the carrier that will eventually be removed when the card is separated from the carrier.

In another preferred embodiment, the present invention essentially comprises a new and improved carrier which fully encapsulates or surrounds the card on all four sides which may generally be referred to as the encapsulated edge embodiment. The embodiment is generally accomplished by modification of initial encoding of the entire magnetic strip that runs across the carrier. Such encoding generally encodes dead or quiet zones at the portion of the carrier that will eventually be removed when the card is separated from the carrier. Furthermore, the preferred embodiment may also include modification of the encoding device such that generally deeper guide edge is achieved. Also, it is contemplated that a hinge means may be incorporated for allowing activation of the card or unit by separating the card from the remaining carrier material and repositioning the card into its original position following activation.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in this application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception upon which this disclosure is based may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Therefore, it is an object of the present invention to provide a new and improved transactional card and system, method for making, distributing, using, and encoding thereof.

It is a further object of the present invention to provide a new and improved transactional card system and encoding method which is of a durable and reliable construction and may be easily and efficiently manufactured and marketed.

An even further object of the present invention is to provide a new and improved transactional card system and encoding method which is susceptible to a low cost of manufacture with regard to both materials and labor, and which accordingly is then susceptible to low prices of sale to the consuming industry, thereby making such invention economically available to those in the industry.

Still another object of the present invention is to provide a new and improved transactional card system and encoding method which provides all of the advantages of the prior art, while simultaneously overcoming some of the disadvantages normally associated therewith.

While still another object of the present invention is to provide a new and improved transactional card system and encoding method which allows the magnetic strip to run the full length of the carrier while still only encoding the portion on the card.

It is a further object of the present invention is to provide a new and improved transactional card system and encoding method which may provide a stronger carrier system which generally encapsulates the entire card on all four sides and simultaneously overcomes encoding problems associated with the start point of encoding information on the stripe.

Yet another object of the present invention is to provide a new and improved transactional card system and encoding method which allows for the card to be surrounded by the carrier on three sides while the card generally forms or is flush with the fourth side of the carrier.

These, together with other objects of the invention, along with the various features of novelty which characterize the invention, are pointed out with particularity in the claims annexed to and forming a part of this disclosure. For a better understanding of the invention, its operating advantages, and the specific objects attained by its uses, reference should be had to the accompanying drawings and descriptive matter in which there are illustrated preferred embodiments of the invention.

BRIEF DESCRIPTION OF THE PICTORIAL ILLUSTRATIONS GRAPHS, DRAWINGS, AND APPENDICES

The invention will be better understood and objects other than those set forth above will become apparent when consideration is given to the following detailed description thereof. Such description makes reference to the annexed drawings wherein:

FIG. 1A generally features the front of a prior art card system depicting the card and its magnetic strip extending past the carrier.

FIG. 1B generally features the back of a prior art card system of FIG. 1A depicting the card and its magnetic strip extending past the carrier.

FIG. 2A generally features the front of a prior art card system depicting the card and its magnetic strip extending past the carrier.

FIG. 2B generally features the back of a prior art card system of FIG. 2A depicting the card and its magnetic strip extending past the carrier.

FIG. 3A is a perspective view of a preferred embodiment of the invention generally depicting a card system with a card and a tag in a carrier with a magnetic strip.

FIG. 3B is a perspective view of the preferred embodiment of the invention from FIG. 3A generally depicting a card system with a card, a tag, a carrier and with a magnetic strip in an exploded view.

FIG. 3C is a front plan view of the preferred embodiment of the invention from FIG. 3A generally depicting a card system with a card and a tag in a carrier.

FIG. 3D is a back plan view of the preferred embodiment of the invention from FIG. 3A generally depicting a card system with a card and a tag in a carrier with a magnetic strip.

FIG. 6A is a perspective view of a preferred embodiment of the invention generally depicting a card system with a card and two tags in a carrier with a magnetic strip.

FIG. 6B is a perspective view of the preferred embodiment of the invention from FIG. 6A generally depicting a card system with a card, two tags, a carrier and with a magnetic strip in an exploded view.

FIG. 6C is a front plan view of the preferred embodiment of the invention from FIG. 6A generally depicting a card system with a card and two tags in a carrier.

FIG. 6D is a back plan view of the preferred embodiment of the invention from FIG. 6A generally depicting a card system with a card and two tags in a carrier with a magnetic strip.

DETAILED DESCRIPTION OF THE PREFERRED EMBODIMENTS

Figure 4A:
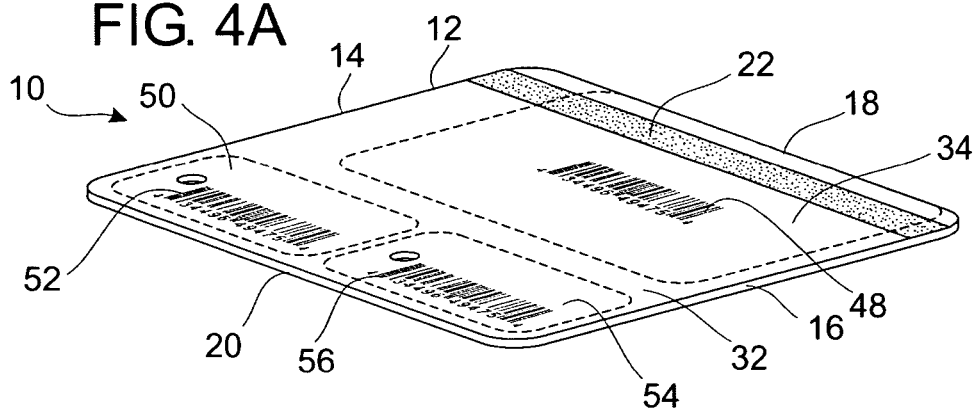
FIG. 4A is a perspective view of a preferred embodiment of the invention generally depicting a card system with a card and two tags in a carrier with a magnetic strip.
Figure 4B:
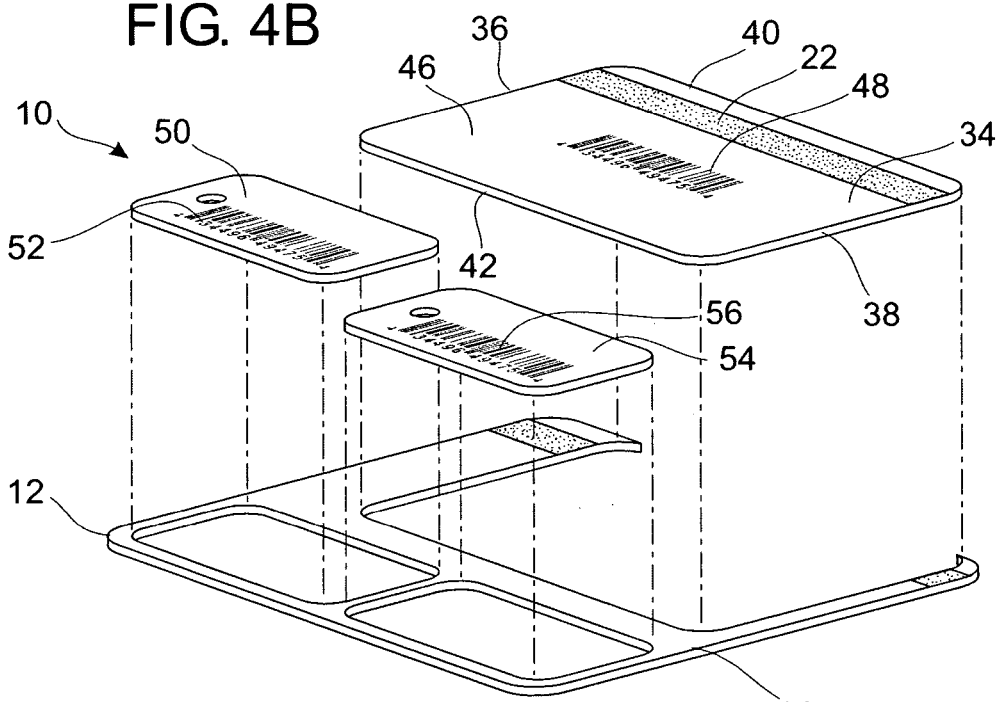
FIG. 4B is a perspective view of the preferred embodiment of the invention from FIG. 4A generally depicting a card system with a card, two tags, a carrier and with a magnetic strip in an exploded view.
Figure 4C:
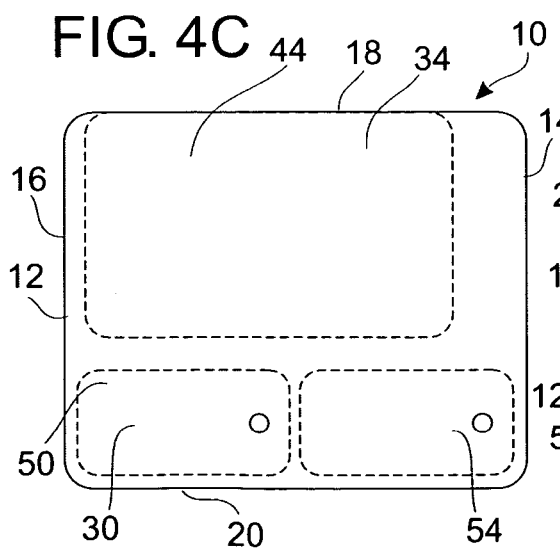
FIG. 4C is a front plan view of the preferred embodiment of the invention from FIG. 4A generally depicting a card system with a card and two tags in a carrier.
Figure 4D:
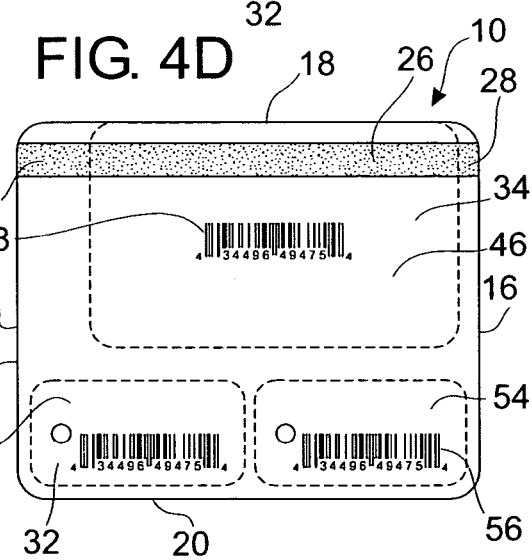
FIG. 4D is a back plan view of the preferred embodiment of the invention from FIG. 4A generally depicting a card system with a card and two tags in a carrier with a magnetic strip.
Figure 5A:
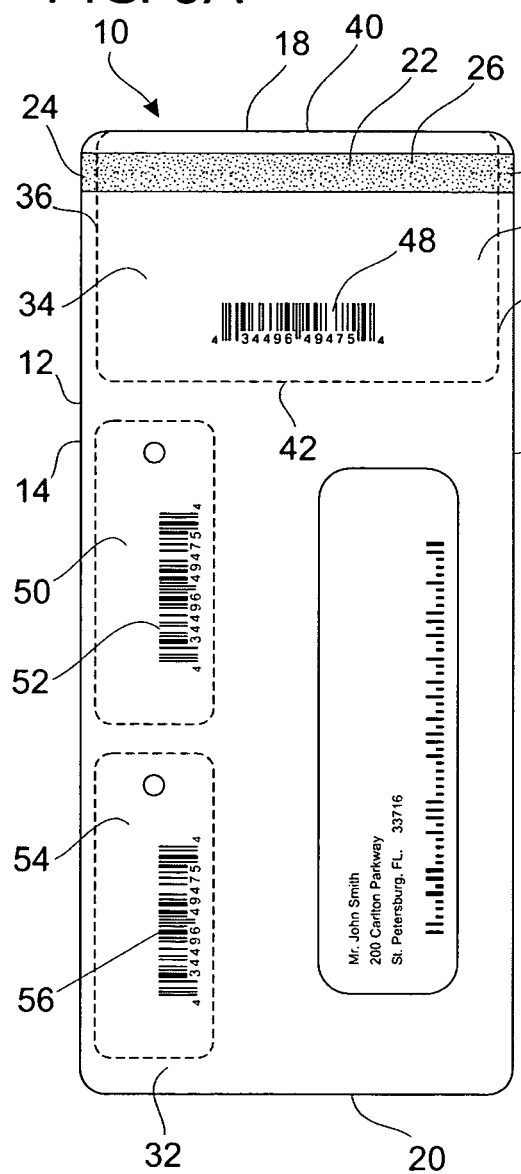
FIG. 5A is a back plan view of a preferred embodiment of the invention generally depicting a card system with a card and two tags with a magnetic strip in a carrier with a configuration for potentially mailing.
Figure 5B:
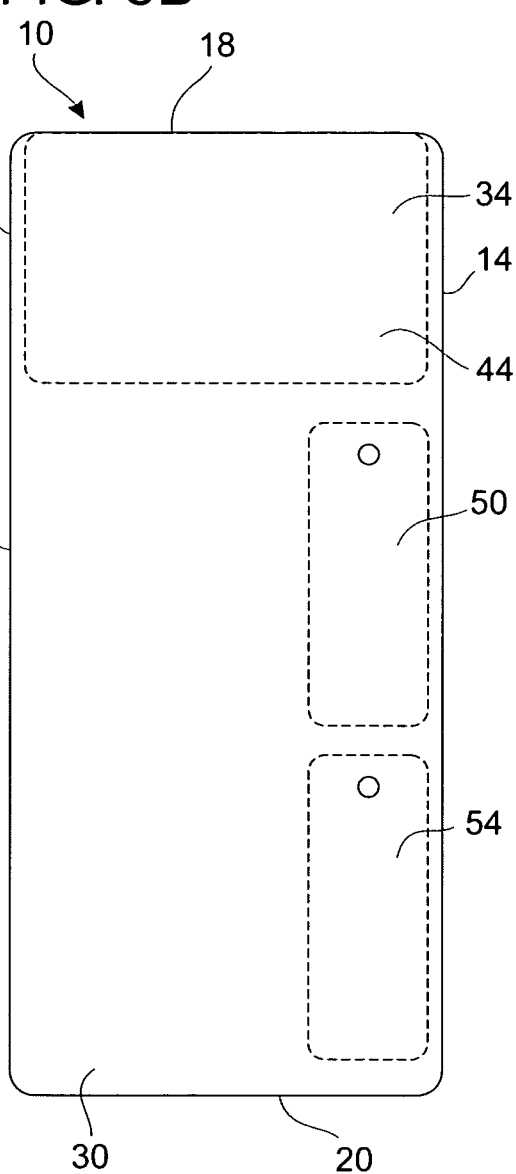
FIG. 5B is a front plan view of the preferred embodiment of the invention from FIG. 5A generally depicting a card system with a card and two tags in a carrier with a magnetic strip.
Figure 7A:
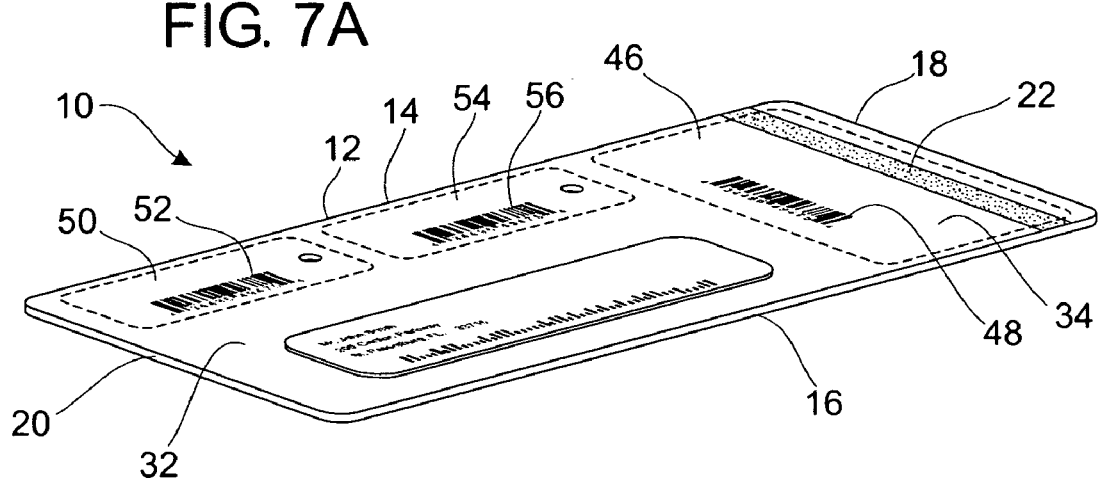
FIG. 7A is a perspective view of a preferred embodiment of the invention generally depicting a card system with a card and two tags with a magnetic strip in a carrier with a configuration for potentially mailing.
Figure 7B:
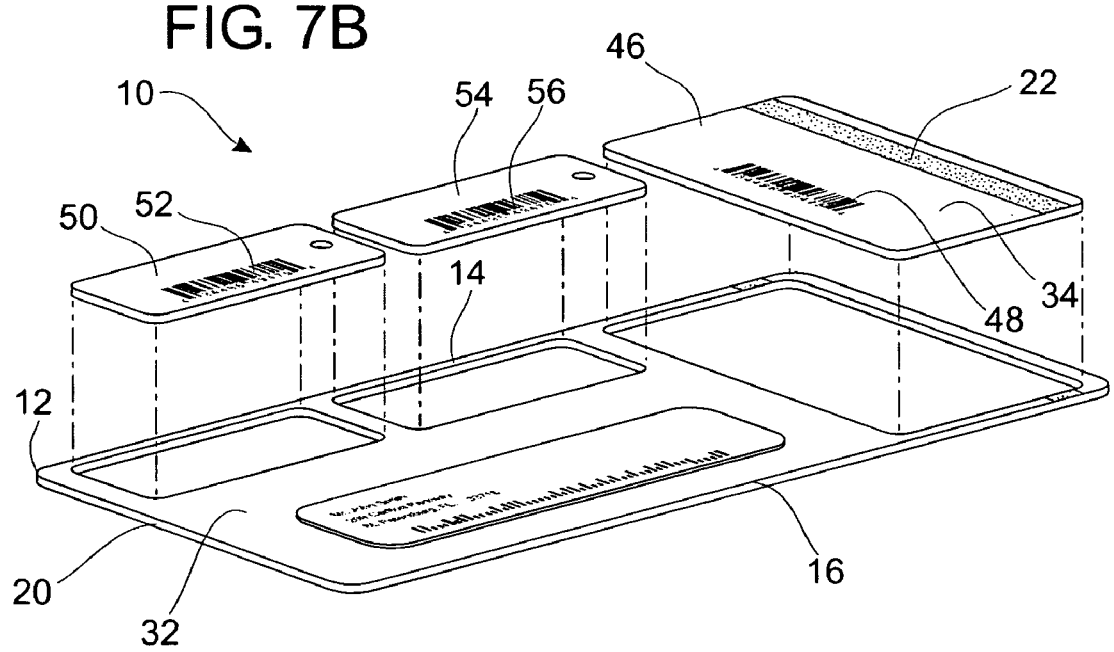
FIG. 7B is a perspective view of the preferred embodiment of the invention from FIG. 7A generally depicting a card system with a card and two tags in a carrier with a magnetic strip in an exploded view.
Figure 8A:
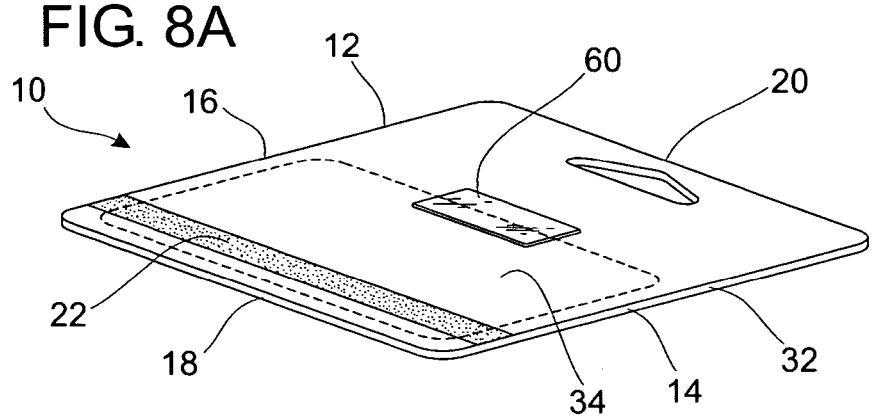
FIG. 8A is a perspective view of a preferred embodiment of the invention generally depicting a card system with a card in a carrier with a magnetic strip and hinge assembly.
Figure 8B:
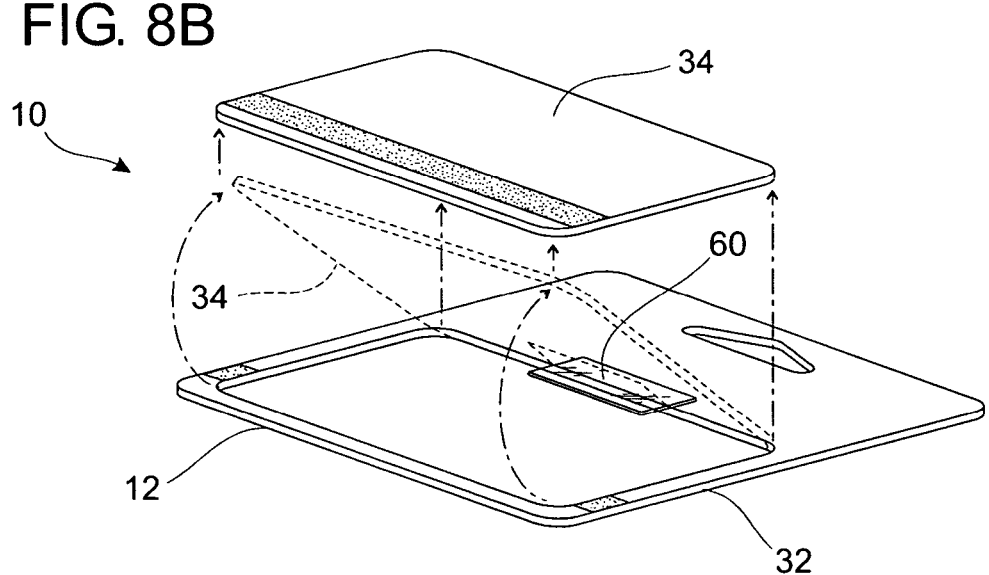
FIG. 8B is a perspective view of the preferred embodiment of the invention from FIG. 8A generally depicting a card system with a card in a carrier and with a magnetic strip in an exploded view wherein a card is swinging from the carrier via the hinge assembly.
Figure 8C:
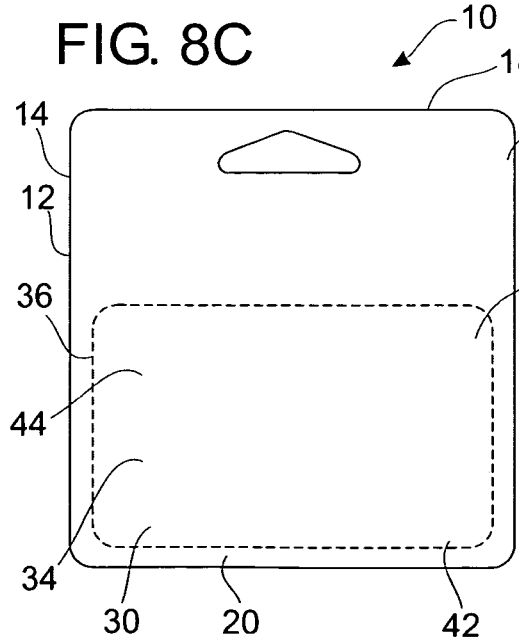
FIG. 8C is a front plan view of the preferred embodiment of the invention from FIG. 8A generally depicting a card system in a carrier.
Figure 8D:
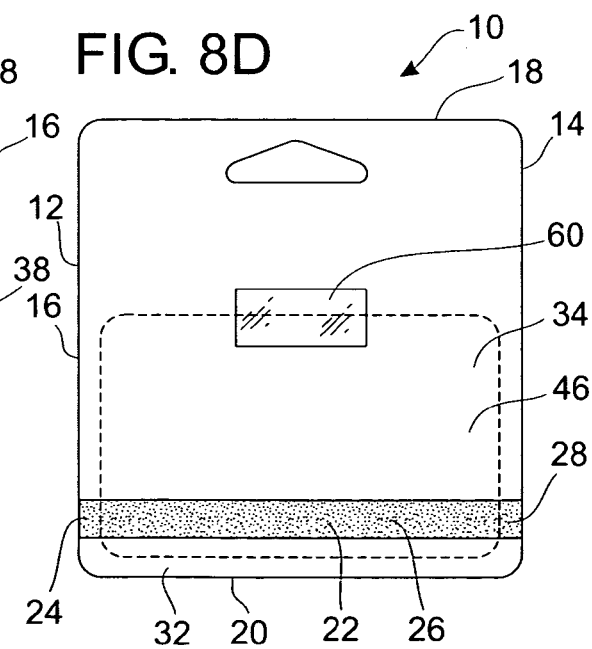
FIG. 8D is a back plan view of the preferred embodiment of the invention from FIG. 8A generally depicting a card system with a card in a carrier with a magnetic strip.
Figure 9:
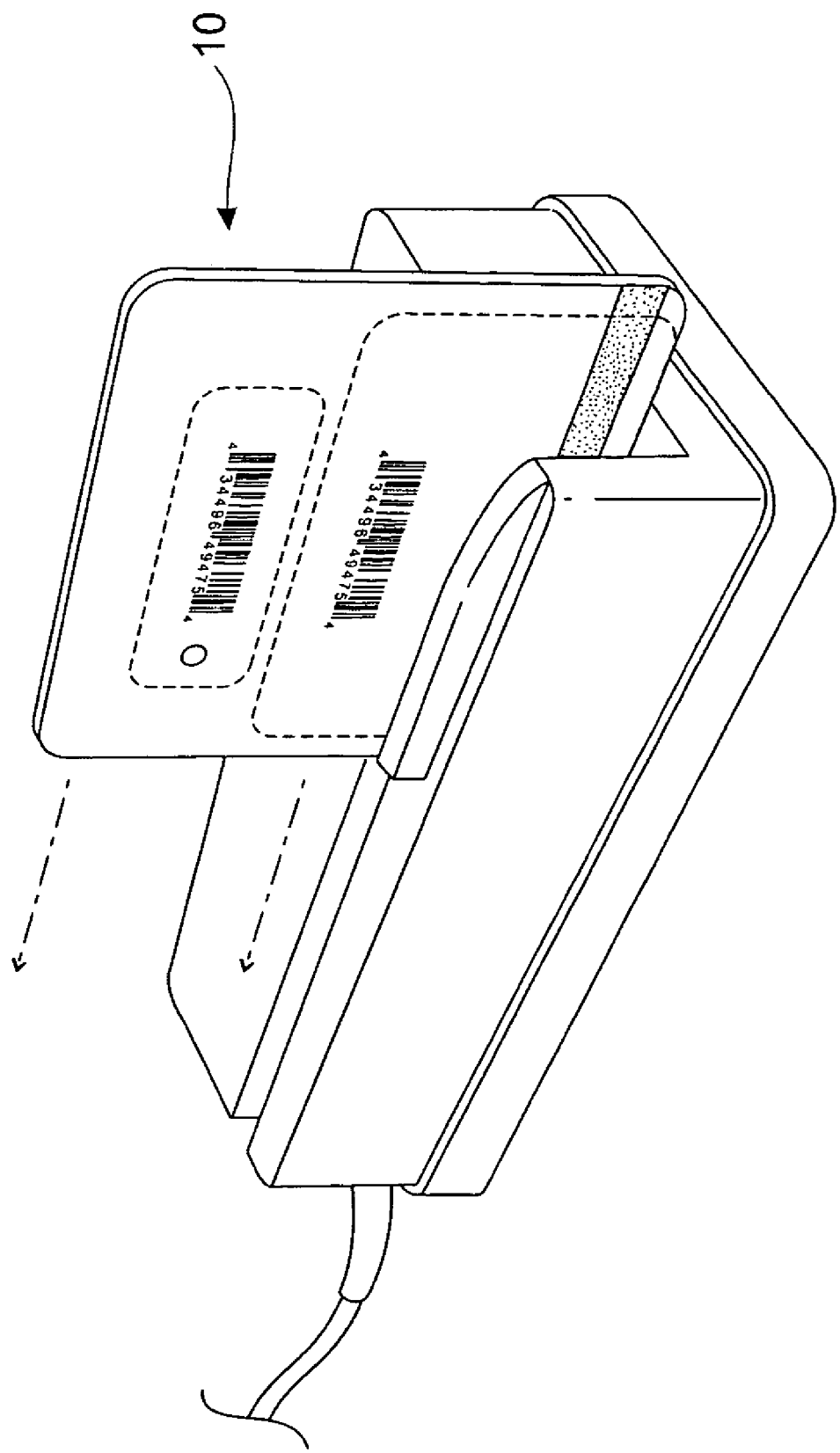
FIG. 9 is a perspective view of a preferred embodiment of the invention wherein a card system is placed into a standard reader/encoder.

The current invention addresses operation, manufacturing, systems and methods for producing new and improved matrix or carriers for use with transactional cards. Referring now to the drawings, wherein like reference numerals designate corresponding structure throughout the views, and referring in particular to FIGS. 3–11, reference numeral 10 generally refers to a new and improved transactional card system and encoding method in accordance with the present invention.

In a preferred construction, a matrix or carrier 12 is formed by methods known in the art. One known method is providing a sheet of material laminated on each side thereof with a transparent plastic material such as a polyester/polyethylene material. The sheet of material is preferably a synthetic paper, such as teslin, but any durable material capable of receiving printed matter and/or encodable matter may be used. The plastic material provides the sheet of material with a protective cover to increase the life of the product and provide a certain degree of rigidity which facilitates handling. The plastic material is bonded to the sheet of material in a conventional manner well known in the art. It is understood that a protective layer of plastic material may not be utilized on one or both sides in accordance with preferred embodiments.

It is known in the art to create a carrier 12 and/or system by first passing the sheet of material through a non-variable printing station where the non-variable data of the product, such as art work, any instructional information and promotional information is disposed on a first portion of the sheet of material. It will be appreciated that data can be disposed on each side of the sheet of material. The sheet of material may then be passed through a variable printing station where the unique customer data which may include the customer's name, mailing address, encoded data and bar codes. After the unique customer data has been disposed on the sheet of material, the sheet of material may be passed through a laminating station where each side of the sheet of material is laminated with the plastic material in a conventional manner. The laminated sheet of material may then be passed through a cutting die and perforating station where the laminated sheet of material is cut to the desired size. The laminated sheet of material is perforated so as to define the respective desired elements as described below. The sheet of material may be perforated such that the end desired elements remains integrally formed with the carrier while being selectively detachable therefrom.

Carrier 12 may include a first side 14, a second side 16, a top side 18, and a bottom side 20. It is to be understood that carrier 12 may be of several configurations and the aforementioned embodiment should not be considered a limitation of the invention by its terms. It is contemplated that carrier 12 may have more sides, less sides, triangular, rectangular, square, have rounded portions and elements of numerous configuration and proportions.

In accordance with a preferred embodiment, carrier 12 may also have a magnetic stripe or strip 22 that may be applied before or after lamination, or at any other preferred step known in the art. Furthermore, magnetic strip 22 may be encoded at any desired step known in the art during the manufacturing process of carrier 12. In general, magnetic strip 22 should transverse carrier 12 from carrier 12 first side 14 to second side 16, although, once again, the terms used should not be considered limiting. Magnetic strip 22 generally comprises a first end 24 or beginning portion, a middle portion 26, and a second end or end portion 28. It is contemplated that magnetic strip 22 first end 24 is generally the portion of the magnetic strip 22 that would lay on the portion of carrier 12 adjacent to card 34, middle portion 26 of magnetic strip 22 would generally refer to the portion of the magnetic strip 22 that would lay on card 34, and second end or end portion 28 of magnetic strip 22 would generally refer to the portion adjacent on carrier 12. Magnetic strip 22 will be discussed in greater detail below. It is further understood that information may be encoded during the manufacturing process on the magnetic strip 22. Such machines known in the art are an ATLANTIC ZEISER MCE 500 or CARDLINE machine may be used and modified as described.

Carrier 12 further comprises a front portion 30 and a back portion 32 and carrier 12 may further include being cut, formed, manufactured, processed or the like having a first removable element or card 34 wherein card 34 has a first side 36, a second side 38, a top side 40, a bottom side 42, a front 44, and a back 46. Card 34 may be integrally formed with the carrier 12 while being selectively detachable therefrom. It is to be understood that these terms should not be considered limiting and for purposes of convenience. Magnetic strip 22 should also generally transverse card 34. Card 34 may further include an identification element 48, such as but not limited to a bar code, or multiple identification elements 48 that may distinguish the card or otherwise make the card individually or otherwise identifiable as unique or otherwise as known in the art.

Carrier 12 may further comprises a second removable element or key fob or tag, second card, tag 50 and so forth integrally formed with the carrier while being selectively detachable therefrom. Tag 50 may also include an identification element 52 that may be identical to card 34 identification element 48 or different if desired. It is understood that carrier 12 may still further include a third removable element, such as but not to be considered limited to a second tag 54 also with an identification element 56 that may as desired correspond or not correspond accordingly to other identification elements. It is contemplated that in a preferred embodiment that identification element 56 may but is not limited to a standard bar code, codes or coding.

Flush Edge Embodiment

In general, a preferred embodiment of invention 10 includes a modified matrix or carrier 12 wherein three complete sides of the card 34 are enclosed or surrounded by the carrier 12 and the fourth side of the card 34, where the magnetic strip 22 is generally located, forms integrally or flush with the fourth side or of the carrier 12. Such preferred embodiment is generally referred to as a flush edge embodiment or configuration. The embodiment is generally accomplished by modification of initial encoding of the entire magnetic strip 22 that runs across the carrier 12. Such encoding generally encodes dead or quiet zones at the portion of the carrier 12 that will eventually be removed when the card 34 is separated from the carrier 12.

State of the art encoding equipment is a combination of hardware and software controlling the processing of the carrier 12 as it is transported in an automated manner via a transport base. Such newer systems may transport the carrier 12 at higher rates of speed than ever before and require an improved, stabilized product or carrier 12 than present in the prior art.

The carrier 12 unit was designed so that the card is surrounded fully by support carrier 12 on at least three sides—all the way to the edge of the fourth side for possible increased stability. The carrier 12 portion on either side of magnetic strip 22 remains intact on both sides of card 34 cut edge. This remaining carrier 12 portion may be about 1/16 inch wide or greater, depending on the position of other card 34 and optional components or elements. In a preferred construction, the carrier 12 is designed so that the card 34 within shares a common edge with the remaining carrier 12, both remaining flush at this edge. The cutting mechanism may be modified to allow for a cutting seam along this common edge allowing for a round corner on each end of the card 34 edge and a flat edge to the carrier 12 nearby, keeping a pure carrier 12 edge.

Figure 10:
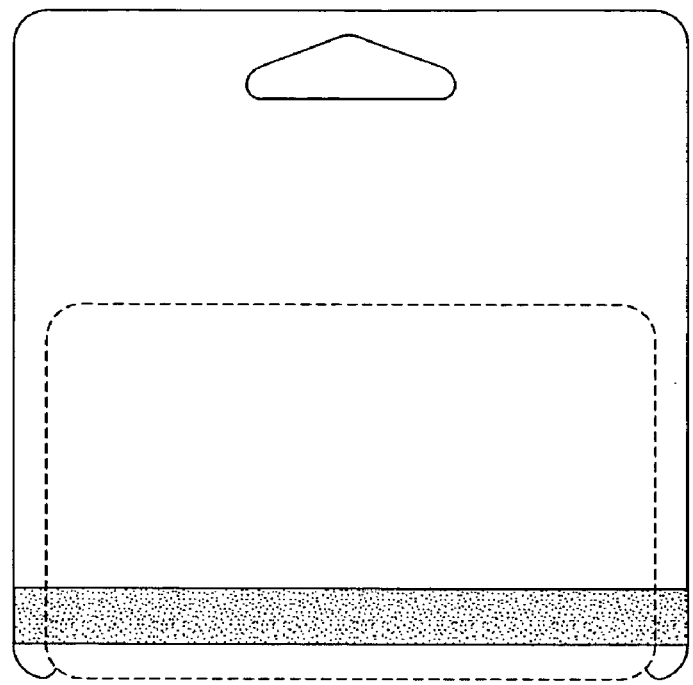
FIG. 10 is a plan view of a preferred embodiment of the invention generally depicting a carrier, a card, and a magnetic strip.
Figure 11:
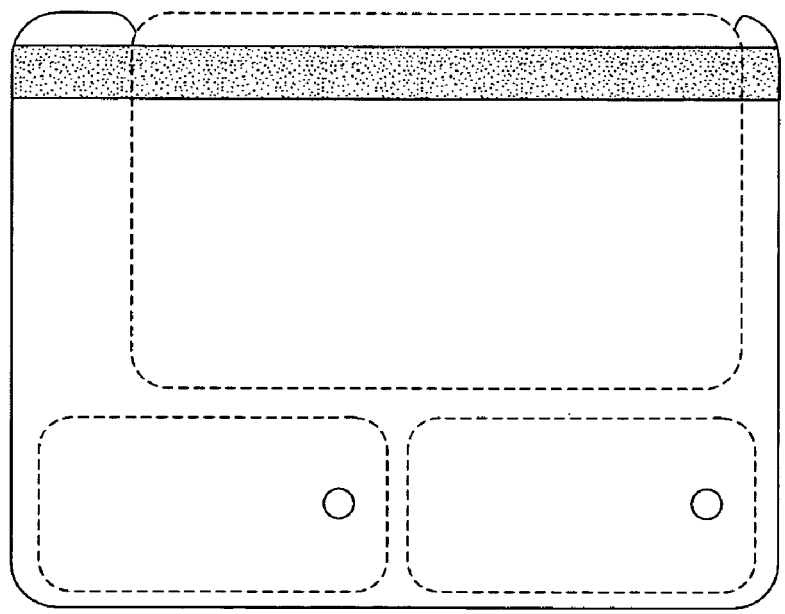
FIG. 11 is a plan view of a preferred embodiment of the invention generally depicting a carrier, a card, a magnetic strip, and two key tags.

In accordance with another preferred embodiment as generally depicted in FIGS. 10 and 11, carrier 12 may be cut to further stabilize the material being cut into finished product shape and to anticipate the stresses the product may endure in the field. The material cut seams of the carrier 12 may turn inward just after reaching the flush portion of the fourth carrier 12 edge and just before the carrier 12 material reaches the card 34, practically bisecting the corner radii nearest the fourth flush edge. It is also contemplated that the aforementioned may reduce wear of cutting elements.

The carrier 12 may be designed with a retail display "hang hole" or "J-hook" or "Sombrero" slot, can be used to display a card unit or combination thereof and benefit from the increased stability of the supporting card 34 carrier 12. In a preferred construction, a hang hold on side opposite magnetic strip 22 may be provided. Alternatively to a hang hole, a modular "hole" tab can be attached to the carrier 12, in the upper portion of the carrier 12. Alternatively to a hang hole, a physical hook can be cut in the carrier 12, extending outwardly from the carrier 12, with an open-ended shape (not a closed parameter opening).

Encoding process and machine changes may include the following but is not limited to such. Because the carrier 12 on either side of the card 34 magnetic strip 22 remains intact on both sides of the card 34 cut edge, modifications of existing machines is necessary as a result of the product change referenced.

In general, a magnetic encoding head as known in the prior art, moving from one end of the card carrier 12 to the other, encounters two cut seams, one on each end of the card 34. Typically, magnetic encoding heads cannot tolerate bumps and vibration during the encoding process. Thus, the encoding heads may be outfitted with springs under each Track1, Track2 and Track3 head that are modified to better accommodate the bumps due to the two cut seams on the magnetic strip 22. It is further contemplated that other shock absorbing assemblies may be used.

A magnetic encoding head, moving from one end of the carrier 12 unit to the other, encounters two cut seams, one on each end of the card 22. The process of encoding variable data cannot begin until sufficient distance has passed after the first cut seam. In a preferred construction, the control software is modified to "delay" encoding until the encoding head has passed over the first cut seam while the encoding head is encoding "quiet zone" prior to variable data encoding (i.e.: like the quiet space in advance of a song recording). As the encoding head passes over the first cut seam on the magnetic stripe 22, it is programmed to record "quiet zone" until a pre-set time/distance has passed, assuring the encode head has passed the first cut seam during this delay. Once this delay has occurred, variable data is then encoded. Following the end of variable data for each magnetic track, "quiet zone" encoding continues past the second cut seam on the magnetic strip 22. Once the carrier 12 unit has passed by the encoding head and the head is no longer adjacent to any portion of the carrier 12, the card 34 is considered encoded and is ready for verification and other processes. The term "quiet zone" should not be considered limiting. It is contemplated that the encoding process or programming may include other means to allow the encoding of desired information and data to start after the cut seam and proceed to the next cut seam.

Encoding by the means described above, a valid card 34 swipe can be achieved by the retailer's card 34 reader via a swipe of the magnetic strip 22 running along the entire flush edge of the carrier 12 unit. Thus, the retailer can reduce waste of inventoried card products because the surrounding carrier 12 supports the product under additional handling by the consumer. Furthermore, additional surrounding carrier 12 on each side of the card 34 unit provides additional product advertising space on the display side of the product.

Encapsulated Edge Embodiment

In another preferred embodiment, the present invention essentially comprises a new and improved carrier 12 which fully encapsulates or surrounds the card 34 all four sides which may generally be referred to as the encapsulated edge embodiment. The embodiment is generally accomplished by modification of initial encoding of the entire magnetic strip 22 that runs across the carrier 12. Such encoding generally encodes dead or quiet zones at the portion of the carrier 12 that will eventually be removed when the card 34 is separated from the carrier 12.

Furthermore, the preferred embodiment may also include modification of the encoding devices known in the art such that generally deeper guide edge is achieved. Also, it is contemplated that a hinge assembly 60 may be incorporated for allowing activation of the card 34 or unit by separating the card from the carrier 12 and allowing repositioning of card 34 generally into its original position within the carrier 12.

The carrier 12 may be designed so that the card 34 is surrounded by support carrier 12 on all four sides—virtually encapsulating the card 34. The carrier 12 may be about 1/16 inch wide or greater depending on the position of other card and keytag components. The carrier 12 unit is designed so that the card 34 within the unit is fully encapsulated within the carrier 12 material, with no edge of the card 34 product touching the outside edge of the carrier 12.

In a preferred construction, the magnetic stripe is placed on the carrier 12, crossing the card 34, with the distance of the magnetic stripe not less than 5/16 inch from the carrier 12 edge. In another preferred construction, the magnetic stripe is placed on the carrier 12, crossing the card 34, with the distance of the magnetic stripe not less than 1/4 inch from the carrier 12 edge. It is contemplated that the distance may still be greater or less in other embodiments.

The distance of the magnetic strip 22, regardless of magnetic strip 22 width, from any edge of the carrier 12 is such that the carrier 12 unit cannot be encoded or read by standard encoding or reading equipment known in the art today while the card 34 remains within the carrier 12. It is contemplated that the card 34 must be removed partially from the carrier 12 for any successful reading of the magnetic strip 22. It is understood that the current state of the art readers generally require the magnetic strip 22 to be located approximately 3/16 inch from the guide edge of card 34. In a preferred construction, the magnetic strip 22 generally should be 3/16 inch from the guide edge of the product as currently defined in the art. Once again, it is contemplated that greater or lesser distance may be utilized in other embodiments.

It is contemplated that a hinge piece or assembly 60 may be but is not limited to a transparent hinge label or sticker that may be applied to one or more seams of the card 34 within the carrier 12. The hinge label is a paper or plastic material that may adhesive applied on the underside of the label allowing the label to stick to the card 34 and carrier 12. The hinge label functions as a pivot point for the card 34 temporary or partial removal from the carrier 12 to allow for a swipe and read via a standard magnetic strip 22 reader at the retail setting and also generally allow repositioning of the card 34 into its original position in carrier 12. The hinge label is sized proportionately to the card 34 such that the card 34 can pivot without the label or card 34 becoming detached by the average handling of the average user.

It is understood that hinge assembly 60 may be of other configurations such as other reinforced material applied to the top of carrier 12 and hingedly attaching to card 34. In another preferred embodiment, the partial cutting of the carrier 12 that forms the break away or tear out portion that later becomes card 34 may have more material left uncut at the bottom side 42 of card 34. It is contemplated that this would require leaving a section or creating a section at the bottom side 42 of card 34 that is not cut as deep as the other portions, but still allows a user to pull the carrier 12 away from the card 34 after it is allowed to act as a hinge for encoding at the point of sale by example.

It is further contemplated machine modification may be necessary as a result of the product change referenced above when the magnetic strip 22 is placed on the carrier 12, crossing the card 34, with the distance of the magnetic strip 22 not less than 5/16 inch from the carrier 12 edge. In another preferred embodiment, it is contemplated machine modification may be necessary as a result of the product change referenced above when the magnetic strip 22 is placed on the carrier 12, crossing the card 34, with the distance of the magnetic strip 22 not less than 1/4 inch from the carrier 12 edge. This may include but is not limited to the exact distance. Once again, it contemplated that greater or lesser distance may be utilized in other embodiments.

In a preferred embodiment, the encoding device is modified to allow for the carrier 12 unit to be positioned "deeper" within the guide edge of the hardware. With a deeper channel, about 1/8 inch deeper than standard channels, the generally encapsulated card 34 magnetic strip 22 is now adjacent to the magnetic encode/read head while remaining within the carrier 12. It is understood that various tooling can be inserted into the encoding assembly guide edge to allow adjustments to the depth of card 34 travel per the manufacturer's wishes. In effect, with adjustable depth in the machine's guide assembly, a magnetic strip 22 can be encoded regardless of placement within a surrounding carrier 12. In a preferred embodiment, an ATLANTIC ZEISER MCE 500 or CARDLINE machine may be used and modified as described.

The method of hinge label application is the automated application of a label as the carrier 12 unit passes adjacent to the label applicator assembly. Furthermore, the hinge label can receive a form of the associated card data. It is contemplated that the label may contain information, such identification information that may be transferable from the carrier 12 to another desired location, such as an application form or so forth. It is understood that the label may not be transparent. It is further contemplated that the label may include other tamper evident, resistant, and/or security features for allowing determination that a card 34 may have been previously detached from the carrier 12.

In another preferred embodiment, carrier 12 and card 34 may not include a magnetic strip 22, but contain another form of transactional card encoding or system for card identification. Card identification element may be bar codes, printed fixed and/or variable card identification information, combination of the aforementioned, and so forth. It is also contemplated that combinations of the aforementioned may further be used with a magnetic strip.

Changes may be made in the combinations, operations, and arrangements of the various parts and elements described herein without departing from the spirit and scope of the invention.

I claim:

1. A method for initial encoding of a transactional card system comprising the steps of:
    a) providing a carrier having a first side, a second side, a top side, a bottom side, a front and a back;
        a card having a first side, a second side, a top side, bottom side, a front and a back, wherein said card is connected to and selectively detachable from said carrier and wherein said carrier encapsulates said card; and
        a magnetic strip for encoding information having a beginning portion, a middle portion and an end portion, wherein said magnetic strip traverses said carrier from said carrier first side across said card to said carrier second side;
    b) encoding a quiet zone on said magnetic strip beginning portion;
    c) encoding desired information on said magnetic strip middle portion; and
    d) encoding a quiet zone on said magnetic strip end portion.

* * * * *